(12) United States Patent
Van Slooten

(10) Patent No.: US 6,229,582 B1
(45) Date of Patent: May 8, 2001

(54) DISPLAY DEVICE WITH SECONDARY ELECTRON EMITTING LAYER

(75) Inventor: Udo Van Slooten, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/070,983

(22) Filed: May 1, 1998

(30) Foreign Application Priority Data

May 9, 1997 (EP) ................................................ 97201403

(51) Int. Cl.⁷ ....................................................... G02F 1/133
(52) U.S. Cl. ............................ 349/32; 313/582; 313/586; 313/495; 313/587; 313/483
(58) Field of Search ............................... 349/32; 313/495, 313/582, 586, 587, 483

(56) References Cited

U.S. PATENT DOCUMENTS

| | | | |
|---|---|---|---|
| 5,596,431 | 1/1997 | Bongaerts et al. ....................... | 349/32 |
| 5,705,886 | * 1/1998 | Bongaerts et al. ..................... | 313/483 |
| 5,783,906 | * 7/1998 | Moore et al. .......................... | 313/586 |
| 5,917,284 | * 6/1999 | Moore et al. .......................... | 313/586 |
| 5,993,543 | * 11/1999 | Aoki et al. .............................. | 117/88 |
| 6,052,160 | * 4/2000 | Bomer et al. .......................... | 349/32 |
| 6,057,895 | * 5/2000 | Van Helleputte et al. ............. | 349/32 |

* cited by examiner

Primary Examiner—William L. Sikes
Assistant Examiner—Tulie Ngo

(57) ABSTRACT

The display device comprises at least one compartment (30, 30', 30") which contains an ionizable gas (33). Walls of the compartment (30, 30', 30") are provided with electrodes (31, 32) for selectively ionizing the gas (33), during operation, by means of a direct current. The display device is characterized in that the walls of the compartment (30, 30', 30") are provided with a layer (20) of a secondary electron-emitting material, the electrons (31, 32) remaining completely or partly uncovered. Preferably, the thickness of the layer (20) exceeds 20 nm, and the secondary electron-emitting material comprises a material of the group formed by magnesium oxide, chromium oxide, silicon nitride and yttrium oxide. Preferably, the display device further comprises an electro-optical layer (35), and a further layer (36) of a dielectric material is situated between the compartment (30, 30', 30") and the electro-optical layer (35), which further layer (36) is provided with the secondary electron-emitting layer (21) on a side facing away from the electro-optical layer (35).

10 Claims, 3 Drawing Sheets

DISPLAY DEVICE WITH SECONDARY ELECTRON EMITTING LAYER

BACKGROUND OF THE INVENTION

The invention relates to a display device comprising at least one compartment, which compartment contains an ionizable gas, walls of the compartment being provided with electrodes for selectively ionizing the ionizable gas during operation, and a voltage being applied across the electrodes during operation.

Display devices for displaying monochromatic or color images comprise, inter alia, direct-current plasma-display panels (dc PDPs) and direct-current plasma-addressed liquid-crystal display devices (dc PALC-displays), both types of display devices preferably being of the thin type.

A display device of the type mentioned in the opening paragraph is known from U.S. Pat. No. 5,596,431 (PHA 60 092). The thin-type display device described in said document comprises a display screen having a pattern of (identical) so-called data-storage or display elements and a plurality of compartments. Said compartments are filled with an ionizable gas and provided with electrodes for (selectively) ionizing the ionizable gas during operation. In the known display device, the compartments are mutually parallel, elongated channels (shaped in a so-called channel plate), which serve as selection means for the display device (the so-called plasma-addressed row electrodes). By applying a voltage difference across the electrodes in one of the channels of the channel plate, electrons are emitted (from the cathode) which ionize the ionizable gas, thus forming a plasma. If the voltage across the electrodes in one channel is switched off and the gas is de-ionized, the following channel is energized. On the display-screen side of the display device, the compartments are closed by a (thin) dielectric layer ("microsheet") provided with a layer of an electro-optical material and further electrodes which serve as so-called data electrodes or column electrodes of the display device. The display device is formed by the assembly of the channel plate with the electrodes and the ionizable gas, the dielectric layer, the layer of the electro-optical material and the further electrodes.

In a plasma-display panel, a plasma-discharge is used, on the one hand, to directly excite phosphors of desirable display elements or, on the other hand, to generate light (for example UV light) which is used to excite phosphors of desirable display elements.

A disadvantage of the known display device is that such display devices exhibit a relatively high energy consumption.

OBJECTS AND SUMMARY OF THE INVENTION

It is an object of the invention to provide, inter alia, a display device exhibiting a lower energy consumption.

To achieve this, the display device in accordance with the invention is characterized in that at least a part of the surface of the walls of the compartment is provided with a layer of a material for emitting secondary electrons, the electrodes being at least partly uncovered.

During the time that the gas is ionized, the plasma-discharge is maintained by applying a specific sustain current and a sustain voltage across the electrodes in the compartment. In a display device with a plasma-discharge in an atmosphere comprising an ionizable gas, this sustain current is much higher, on average, than in the case of a (pure) discharge between two electrodes under vacuum conditions. In the known display device, a (considerable) part of the electrons and ions in the plasma discharge are lost at the walls of the compartment. By covering, in accordance with the invention, at least a part of the surface of the walls of the compartment with a layer of a material having a (high) secondary electron-emission coefficient, the losses at the walls are reduced and the sustain current for maintaining the plasma in display devices in accordance with the invention is lower than in the known display devices. Said lower sustain current causes the energy consumption of the display device to be reduced. As the plasma-discharge is maintained by a direct current, the secondary electron-emitting material leaves the electrodes at least partly uncovered.

A material for emitting secondary electrons is taken to mean in this application, a material which emits one or more secondary electrons in response to a (primary) electron which is incident on (the surface of) the material. The yield $\delta$ of secondary electrons is a function of the energy of the primary electrons $E_p$, the maximum yield $\delta_{max}$ being achieved at a value of the primary electron energy of $E_p^{max}$. The two primary-electron energy values corresponding to a yield of $\delta=1$ are commonly referred to as the first and the second crossover and are referenced $E_I$ and $E_{II}$, respectively. Preferably, the secondary electron-emitting materials covering parts of the surface of the walls of the compartment of the display device have a relatively low first crossover energy value $E_I$. As a result of the high density and a plurality of intercollisions, the primary energy values of the drifting electrons reaching the wall of the compartment are relatively low (in the range between 2 and 5 eV). The above-mentioned choice of $E_I$ enables a relatively high secondary-electron yield to be achieved.

In general, the display device comprises a number of compartments, each compartment comprising at least two electrodes for ionizing the gas.

An additional advantage of covering the walls of the compartment of the display device with the secondary emitting material is that the depth of the compartment can be reduced (for example by 10–20%). Such a reduction is possible because the walls contribute to the provision of (secondary) electrons to the plasma discharge, so that a compartment having a smaller depth is sufficient.

To bring about a uniform ignition of the plasma-discharge, it is desirable that the effective surface area of the electrodes should be as large as possible. To achieve this, the electrodes are preferably completely uncovered, that is, they are not provided with a layer of the secondary emitting material.

It is also desirable that the layer of the material provided on the walls of the compartment should not only have a high secondary-electron yield but also a high stability against ion and electron bombardment. To achieve this, an embodiment of the display device in accordance with the invention is characterized in that the material includes a material of the group formed by magnesium oxide (MgO), chromium trioxide ($Cr_2O_3$), silicon nitride ($Si_3N_4$) and yttrium trioxide ($Y_2O_3$). A material which can very suitably be used is magnesium oxide MgO (high stability against ion and electron bombardment) which has a measured secondary-electron emission coefficient $\delta$ of approximately 5 to 11. Other suitable materials are $TiO_2$, $Ta_2O_5$, AlN and $Al_2O_3$. Particularly $Al_2O_3$ has a high secondary electron-emission coefficient ($\delta \approx 10$). The use of mixtures of said materials enables the desired properties of the layer of the secondary emitting material to be achieved.

A preferred embodiment of the display device in accordance with the invention is characterized in that the thickness of the secondary electron-emitting layer is above 20 nm. Too thin a layer (<5 nm) contributes only little to the secondary electron emission. Secondary electron-emission measurements carried out on said materials show that the yield of secondary electrons increases rapidly up to a layer thickness of approximately 20 nm, between 20 and 40 nm a further improvement of the yield is obtained and, at layer thicknesses≧40 nm, the yield of secondary electrons remains stable.

An embodiment of the display device in accordance with the invention is characterized in that the compartment comprises an elongated channel. If the display device is composed of a number of channel-shaped compartments, these channels are arranged so as to be mutually parallel. The secondary electron-emitting layer can be provided more readily in such elongated channels than in the plurality of compartments. In addition, in the case of channels, the ratio of the surface of the walls to the volume of the compartments is relatively favorable.

Further preferred embodiments of the display device in accordance with the invention are characterized in that the compartment comprises phosphors. In this case, two types of phosphors can be distinguished, that is, so-called electroluminescent phosphors, in which the ionized gas in the compartment itself excites the phosphors, and so-called photoluminescent phosphors, in which the ionized gas emits light (for example UV light) which excites the phosphors. The above-mentioned embodiments generally relate to plasma-display panels.

Other preferred embodiments of the display device in accordance with the invention are characterized in that the display device comprises a layer of an electro-optical material, for example a liquid-crystal material. In this case, the ionized gas acts as a virtual switch for the electro-optical material. For this reason, such display devices are referred to as plasma-addressed (liquid-crystal) display panels.

These and other aspects of the invention will be apparent from and elucidated with reference to the embodiments described hereinafter.

BRIEF DESCRIPTION OF THE DRAWINGS

In the drawings.

The Figures are purely schematic and not drawn to scale. In particular for clarity, some dimensions are exaggerated strongly. In the Figures, like reference numerals refer to like parts whenever possible.

DESCRIPTION OF THE PREFERRED EMBODIMENTS

Figure 1:
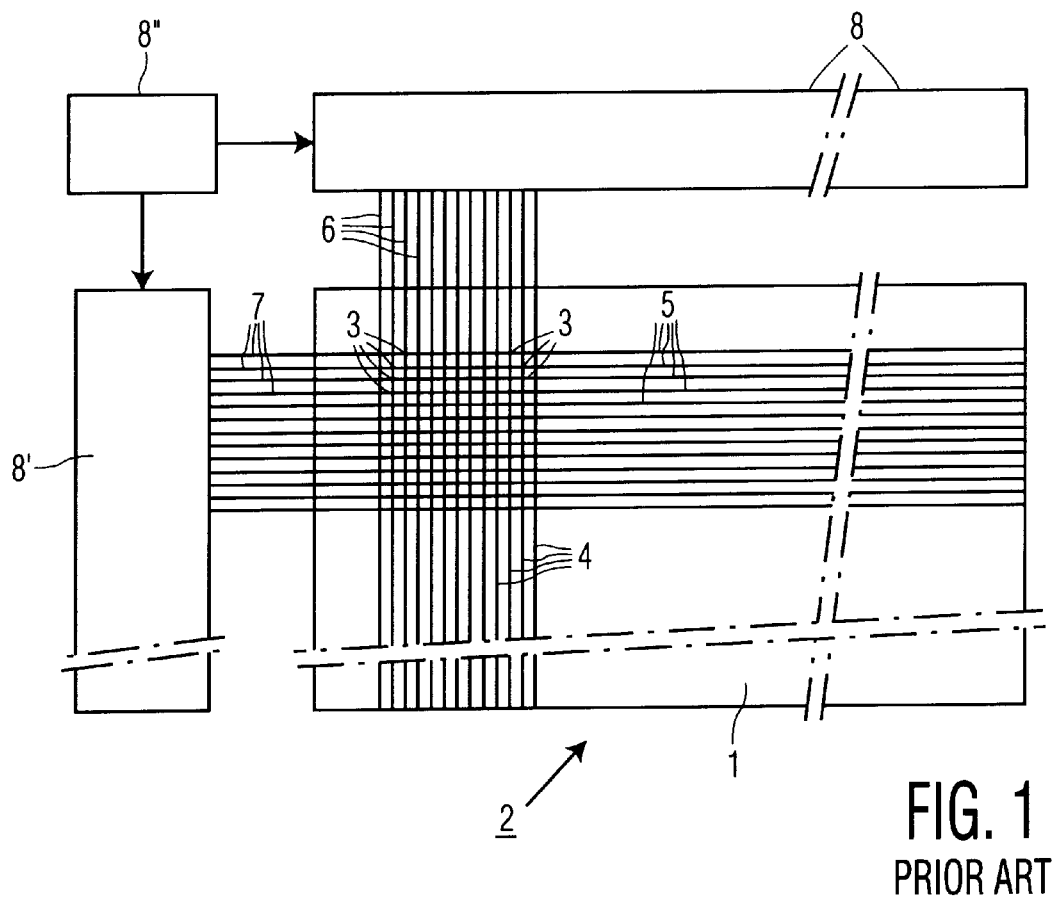
FIG. 1 schematically shows a block diagram of a display device.

FIG. 1 very schematically shows a block diagram of a conventional display device. Said display device comprises a substrate 1 with a surface 2 which is provided with a pattern of pixels which are separated from each other in the vertical and horizontal directions (the space between the pixels being predetermined). Each pixel 3 comprises overlapping portions of (thin, narrow) electrodes 4 of a group of electrodes arranged in vertical columns and (thin, narrow) electrodes 5 of a further group of electrodes arranged in horizontal rows. The electrodes 4 of the group of electrodes are also referred to as column electrodes, and electrodes 5 of the further group of electrodes are also referred to as row electrodes. In a plasma-addressed liquid-crystal display device (PALC), the rows are formed by long, narrow channels (the compartment). The pixels 3 in each of the rows of electrodes (channels) 5 represent one data line.

The width of the electrodes 4, 5 determines the dimensions of the pixels 3, which are typically rectangular in shape. Electrodes 4 receive (analog) drive signals ("data drive signals") from a drive circuit 8 via parallel conductors 6, and electrodes 5 receive (analog) drive signals ("data drive signals") from a drive circuit 8' via parallel conductors 7.

To realize an image or a data-graphic display on a relevant area of the surface 2 of substrate 1, the display device employs a control circuit 8" ("scan control circuit"), which controls the drive circuits 8, 8'. In the display device, use can be made of various types of electro-optical materials. Examples of electro-optical materials include nematic or ferro-electric liquid-crystal materials. In general, the electro-optical materials weaken the passed or reflected light in response to a voltage applied across the material.

Figure 2:
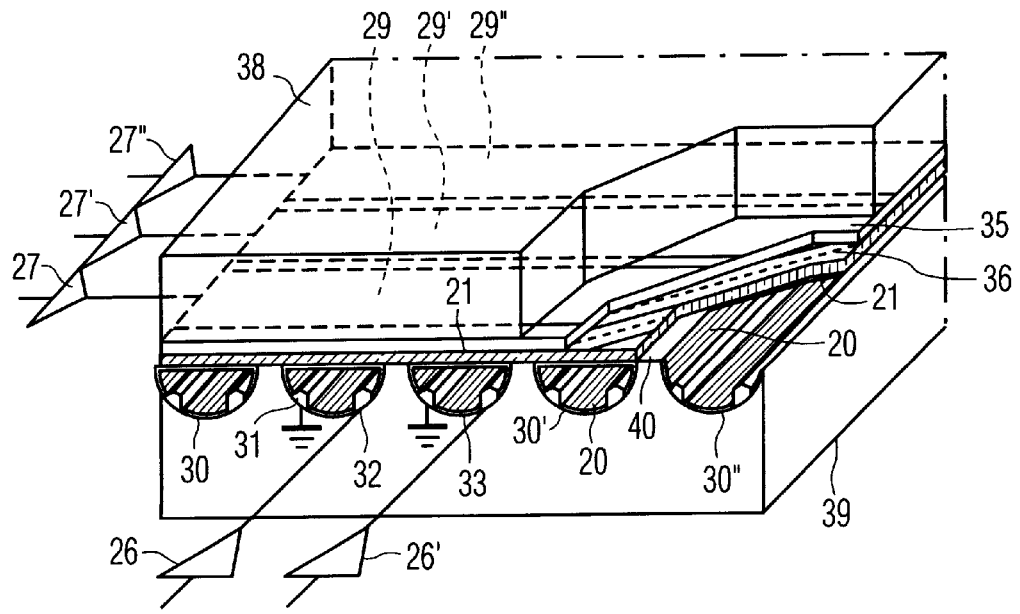
FIG. 2 is a schematical, perspective view, partly cut away, of a part of a construction of a plasma-addressed liquid-crystal display device (PALC) in accordance with the invention.

FIG. 2 shows a schematic, perspective view, partly cut away, of a part of a construction of a plasma-addressed liquid-crystal display device (PALC) in accordance with the invention, which comprises a first substrate 38 and a second substrate 39. In FIG. 2, only three column electrodes 29, 29', 29" are shown. The row electrodes 30, 30', 30" which serve as selection means are formed by a number of mutually parallel, elongated channels (compartments) under a layer 35 of an electro-optical material. The panel is provided with electric connections to the column electrodes 29, 29', 29" and to the plasma electrodes 31, 32, said column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each of the (plasma) channels 30, 30', 30" is filled with an ionizable gas 33 (for example a low-pressure ionizable gas, such as helium, neon and, if desirable, argon) and is sealed with a thin dielectric layer ("microsheet") 36, which is made, for example, of glass. Each of the compartments (the channels) is provided, at an inner surface (wall), with first and second elongated electrodes 31, 32 extending throughout the length of the channel. The second electrode 32 is referred to as the anode and a direct-current pulse, a so-called "dc strobe pulse", is applied to said anode, causing electrons emitted from the cathode 31 to ionize the gas, thereby forming a plasma. In an alternative embodiment, a negative direct current pulse is applied to the cathode. The next channel is not energized until after the "dc strobe pulse" has ended and the gas has been de-ionized. To reduce the duration of the cycle, the subsequent channel is generally ionized already before the previous channel has been (completely) de-ionized. The column electrodes 29, 29', 29" each cross an entire column of pixels, so that, in order to preclude crosstalk, the number of possible plasma row connections per unit of time is limited to only one. The output amplifiers 26, 26' in combination with the drive circuits 8, 8' and the control circuit 8" form the means for applying a dc voltage across the electrodes (31, 32) for selectively ionizing the gas (33) during operation.

With the exception of the electrodes 31, 32, the walls of the channels (the compartments) are provided with a layer 20 of a material which emits secondary electrons when the gas is ionized. In the example associated with FIG. 2, also the lower side of the dielectric layer 36 is provided, at the location of the channels, with a layer 21 of a material which emits secondary electrons when the gas is ionized. By virtue of said coating, the (ion and electron) losses at the walls of the channels of the display device are reduced considerably, so that the sustain current necessary for maintaining the plasma in the channels is lower and hence the energy consumption of the display device in accordance with the invention is much lower than that of the known display device.

In the manufacture of the PALC display device, the thin layer of MgO is applied to the walls of the channels, for example, by vapor deposition or spray pyrolysis (typical thickness approximately 50–100 nm), during which operation the electrodes are shielded. In an alternative embodiment, the electrodes are not provided until after MgO has been applied to the walls. Preferably, also the thin, dielectric (glass) "microsheet" 36 is provided with an MgO layer 21 on the side facing away from the electro-optical layer 35.

Figure 3A:
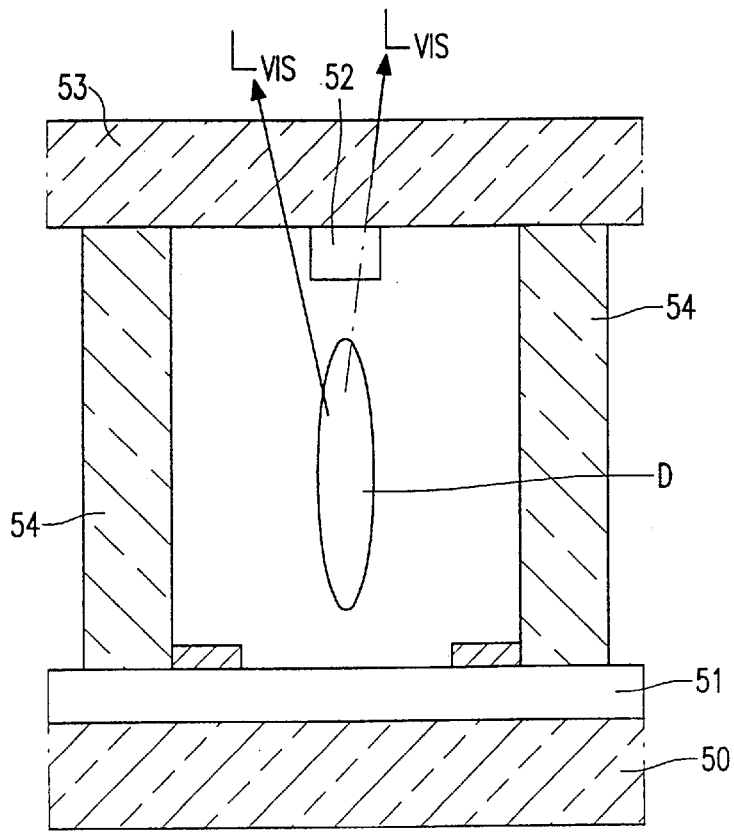
FIG. 3A is a schematic, sectional view of an embodiment of a compartment of a monochrome plasma-display panel, in which visible light is produced in a discharge of an ionized gas.

FIG. 3A is a schematic, sectional view of an embodiment of one compartment of a monochrome plasma-display panel, in which visible light $L_{vis}$ is produced in the negative glow D of a (weakly) ionized gas. In this example, the PDP comprises a rear wall 50, for example of glass, on which a cathode 51 is provided. The anode 52 is situated on the light-transmitting front wall 53 which is located opposite the rear wall 50 and which is for example also made of glass. The anode 52 is preferably made of a light-transmitting material (for example indium tin oxide (ITO)). The compartments are separated from each other by walls 54. The color of the emitted light $L_{vis}$ depends on the gas composition. For example, neon (Ne) produces orange-red light, xenon (Xe) produces white light. Also gas mixtures of neon-argon (Ne—Ar) and of neon-xenon (Ne—Xe) are used.

Figure 3B:
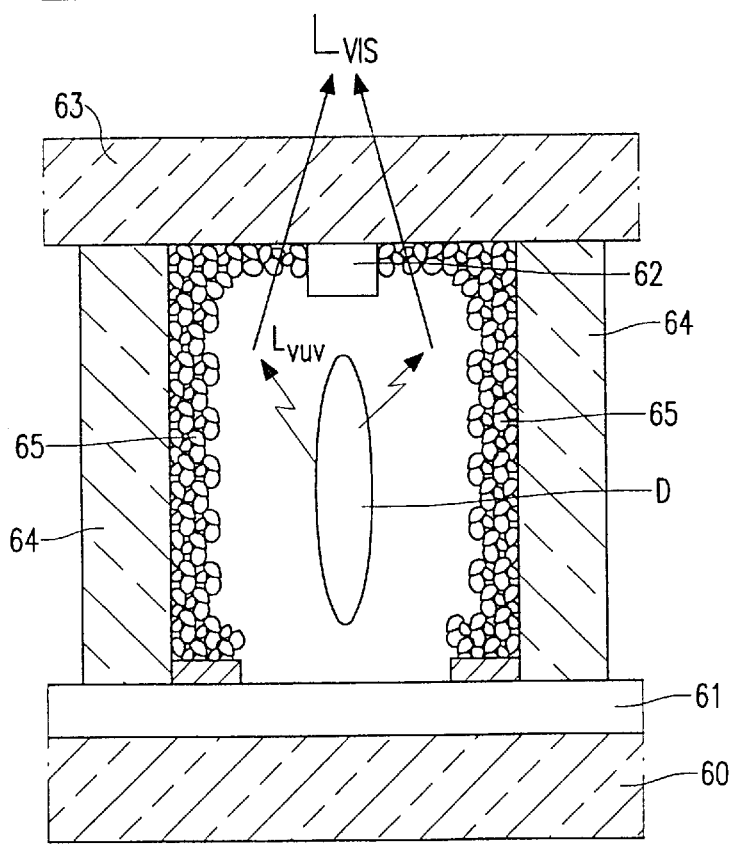
FIG. 3B is a schematic, sectional view of an embodiment of a compartment of a color-plasma display panel, in which the plasma-discharge emits visible or UV-light which excites the phosphors.

FIG. 3B is a schematic, sectional view of an embodiment of one compartment of a color plasma-display panel, in which the plasma-discharge D emits visible or UV-light $L_{vuv}$ which excites the phosphors. In this example, the PDP comprises a rear wall 60, for example of glass, on which a cathode 61 is provided. The anode 62 is situated on the light-transmitting front wall 63 which is located opposite the rear wall 60 and which is for example also made of glass. The anode 62 is preferably made of a light-transmitting material (for example indium tin oxide (ITO)). The compartments are separated from each other by walls 64 which also ensure that light emitted by the plasma cannot reach adjoining compartments (limitation of crosstalk). Besides, in general, visible light originating directly from the plasma-discharge D must not reach the viewer.

In the example associated with FIG. 3B, photoluminescent or electroluminescent phosphors 65 are provided on the walls of the compartments, each compartment generally containing one of the basic colors red, green and blue. In principle, there is a regular pattern which is always comprised of three or four compartments, that is, a red, a blue and a green compartment with, possibly, one of the colors in a double configuration. A complete color palette can be obtained by adjusting the intensities of the light emitted by the individual display elements (sub-pixels) of the PDP independently of each other. The intensity of the plasma-discharge depends on the gas composition. In particular, xenon (Xe), helium (He) and mixtures of neon-xenon (Ne—Xe) or helium-xenon (He—Xe) can effectively be used to excite the phosphors. In the example associated with FIG. 3B, the phosphors are provided on the inner surface of the front wall 63; such a configuration is referred to as "transmissive view" PDP. In an alternative embodiment, the phosphors are located on the inner surface of the rear wall 60; such a configuration is referred to as "direct view" or "reflective view" PDP.

Figure 4:
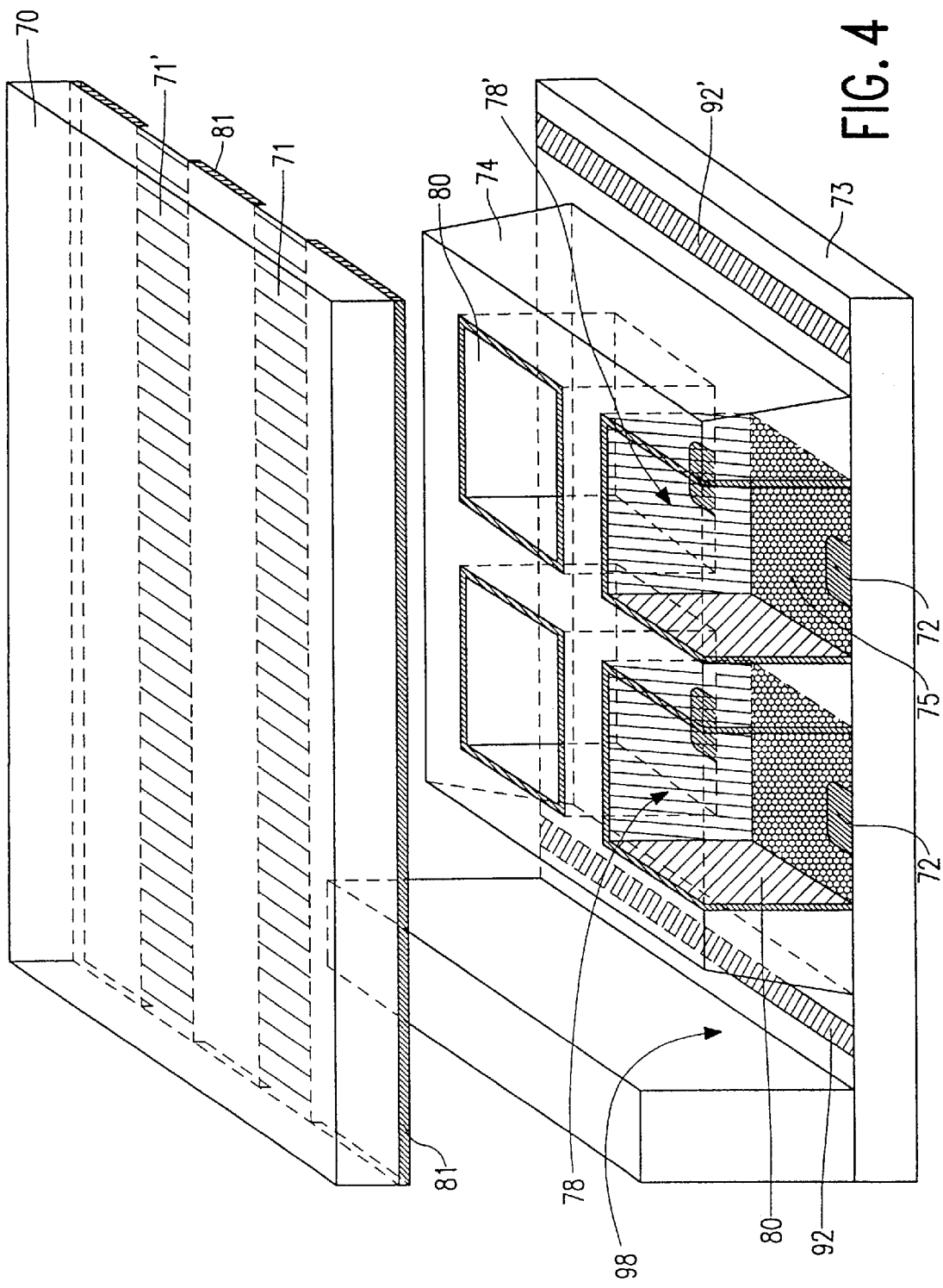
FIG. 4 is a schematic, perspective view, partly cut away, of a part of a construction of a plasma-display panel (PDP) in accordance with the invention.

FIG. 4 is a schematic, perspective view, partly cut away, of a part of a construction of a plasma-display panel (PDP) in accordance with the invention. The embodiment shown comprises four compartments 78, 78' of a color plasma-display panel, the plasma-discharge emitting visible or UV-light which excites the phosphors. In this example, the PDP comprises a rear wall 70, for example of glass, on which cathodes 71, 71' are provided. Anodes 72, 72' are situated on the light-transmitting front wall 73 which is located opposite the rear wall 70 and which is for example also made of glass. (In FIG. 4, for clarity, the rear wall 70 is drawn so as to be detached from the front wall 73). The anodes 72, 72' are preferably made of a light-transmitting material (for example indium tin oxide (ITO)). The compartments (pixels) 78, 78' are separated from each other by walls 74 which also ensure that light emitted by the plasma does not reach adjoining compartments (limitation of crosstalk). In addition, visible light emitted by the plasma must not reach the viewer. FIG. 4 shows an example of a "transmissive view" PDP, in which phosphors 75 are provided on the inner surface of the front wall 73.

In a dc PDP, the electrodes are exposed to the plasma-discharge, so that, if a voltage is applied in one of the compartments, electrons are ejected from the cathode. In a dc-type PDP, the discharge can continue as long as the voltage is applied. The voltage necessary to maintain the plasma discharge typically amounts to several hundred volts. An ionizable gas at a specific pressure (a typical gas pressure ranges from 2 to 20 kPa) is present between the electrodes, said gas being partly ionized by the electrons. In the electric field between the electrodes, the electrons and the ions formed are accelerated. This acceleration is limited by elastic collisions with neutral particles in the ionizable gas. From time to time, the charged particles lose speed as a result of elastic collisions, whereafter they gain speed again under the influence of the electric field. The macroscopic result is that the electrons and the ions are not accelerated, but instead move at a constant velocity, which is referred to as the "drift velocity", at which the electrons gradually move towards the anode and the ions gradually move towards the cathode. In general, the drift velocity of the electrons is twice as high as the drift velocity of the ions.

In a dc-type plasma panel (see the example associated with FIG. 4), the primary discharge generally takes place in an auxiliary cell 98 which is situated next to the compartments 78, 78' for the emission of light. The auxiliary cell 98 comprises an electrode 92, 92'. As the primary plasma discharge in the auxiliary cell 98 does not contribute to the light emitted, the display device has a high level of black color and a good contrast.

Each of the compartments (pixels) in a dc plasma-display panel generally also comprises a current-limiting resistance (not shown in FIG. 4), enabling a plurality of grey levels to be adjusted in a simple manner.

In accordance with the invention, the walls 74 at the inner surface of the compartments 78, 78' are provided with a layer 80 of a material emitting secondary electrons when the gas is ionized. The anodes 72, 72' are not covered with the secondary electron-emitting material. In the example associated with FIG. 4, also the side of the rear wall 70 facing the compartments 78, 78' is provided with a layer 81 of a material emitting secondary electrons when the gas is ionized. The cathodes 71, 71' are not covered with the secondary electron-emitting material. Said coating causes the (electron) losses at the walls of the channels of the display device to be reduced considerably, so that the sustain current necessary for maintaining the plasma in the channels is lower and hence the energy consumption of the display device in accordance with the invention is much lower than that of the known display device.

It will be obvious that within the scope of the invention many variations are possible to those skilled in the art.

What is claimed is:

1. A display device comprising at least one compartment, which compartment contains an ionizable gas, walls of the compartment being provided with electrodes for selectively ionizing the ionizable gas during operation, and a DC-voltage being applied across the electrodes during operation, characterized in that at least a part of the surface of the walls of the compartment is provided with a layer secondary electron-emitting of a material for emitting secondary electrons, the electrodes being at least partly uncovered.

2. A display device as claimed in claim 1, characterized in that the electrodes are completely uncovered.

3. A display device as claimed in claim 1, characterized in that the material includes a material of the group formed by magnesium oxide, chromium oxide, silicon nitride and yttrium oxide.

4. A display device as claimed in claim 1, characterized in that the thickness of the secondary electron-emitting layer is above 20 nm.

5. A display device as claimed in claim 1, characterized in that the compartment comprises an elongated channel.

6. A display device as claimed in claim 1, characterized in that the compartment comprises electroluminescent or photoluminescent phosphors.

7. A display device as claimed in claim 1, characterized in that the display device comprises a layer of an electro-optical material.

8. A display device as claimed in claim 7, characterized in that the electro-optical material comprises a liquid-crystal material.

9. A display device as claimed in claim 7, characterized in that a further layer of a dielectric material is situated between the compartment and the layer of the electro-optical material, which further layer is provided, on the side facing away from the electro-optical layer, with a further secondary electron-emitting layer.

10. A display device as claimed in claim 1, characterized in that the display device is provided with means for applying a direct voltage across the electrodes for selectively ionizing the gas during operation.

* * * * *